(12) United States Patent
Wilbrink et al.

(10) Patent No.: US 7,617,191 B2
(45) Date of Patent: Nov. 10, 2009

(54) SEARCH SERVICE THAT ACCESSES AND HIGHLIGHTS PREVIOUSLY ACCESSED LOCAL AND ONLINE AVAILABLE INFORMATION SOURCES

(75) Inventors: Tijs I. Wilbrink, Voorburg (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 11/306,667

(22) Filed: Jan. 6, 2006

(65) Prior Publication Data
US 2007/0174237 A1 Jul. 26, 2007

(51) Int. Cl.
*G06F 7/00* (2006.01)
(52) U.S. Cl. .................. 707/3; 707/6; 707/7; 715/811; 709/218
(58) Field of Classification Search .................. 707/3, 707/6, 7; 715/811; 709/218, 203
See application file for complete search history.

(56) References Cited

U.S. PATENT DOCUMENTS

| | | | |
|---|---|---|---|
| 5,982,370 A | 11/1999 | Kamper | |
| 6,460,060 B1 | 10/2002 | Maddalozzo, Jr. et al. | |
| 6,480,853 B1 | 11/2002 | Jain | |
| 6,718,365 B1 | 4/2004 | Dutta | |
| 6,751,611 B2 | 6/2004 | Krupin et al. | |
| 2001/0051943 A1* | 12/2001 | Drucker et al. ................. | 707/3 |
| 2002/0091836 A1 | 7/2002 | Moetteli | |
| 2004/0001104 A1 | 1/2004 | Sommerer et al. | |
| 2004/0083127 A1 | 4/2004 | Lunsford et al. | |
| 2004/0088328 A1 | 5/2004 | Cook et al. | |
| 2004/0162820 A1 | 8/2004 | James et al. | |
| 2006/0100988 A1* | 5/2006 | Hong et al. .................... | 707/3 |
| 2006/0106793 A1* | 5/2006 | Liang ........................... | 707/5 |

* cited by examiner

*Primary Examiner*—Hosain T Alam
*Assistant Examiner*—Jieying Tang
(74) *Attorney, Agent, or Firm*—DeLio & Peterson, LLC; Kelly M. Nowak; Ronald Kaschak (57) ABSTRACT

Methods, systems and program storage devices for generating search engine search results. Online files relevant to a requested search query are located by a search engine, while simultaneously previously accessed offline files residing on a client computer are located using the same search query. The search engine retrieves the offline files from the client computer and combines such offline files with the locate online files in a single search result overview. The listing of files within the combined search results are ranked according to relevancy to the search query using a search engine scoring algorithm, whereby the offline files within the combined search results are preferably brought to a user's attention to indicate that such files reside on the client computer.

14 Claims, 5 Drawing Sheets

SEARCH SERVICE THAT ACCESSES AND HIGHLIGHTS PREVIOUSLY ACCESSED LOCAL AND ONLINE AVAILABLE INFORMATION SOURCES

BACKGROUND OF THE INVENTION

1. Field of the Invention

This invention relates to methods, systems, and apparatus for search engines and searchable content rich databases to incorporate within currently displayed search results, and bring to the users attention, previously accessed search results stored on a user's local system that are relevant to the current search request.

2. Description of Related Art

Both the Internet and intranets are well known means of communication that allow the exchange and retrieval of large amounts of information. This information is exchanged and retrieved on the Internet and intranets by a user accessing a server via a web browser running on the user's local system (e.g., a client computer). The web browser provides a graphical user interface ("GUI") for retrieving and viewing information, applications and other resources hosted by Internet/intranet servers (hereinafter collectively referred to as "web servers").

Web servers generally deliver web content to web browsers in the form of web pages using a Hypertext Transfer Protocol ("HTTP"). HTTP is an application protocol that provides a user access to web sites, or the web pages of such web sites, which have various formats including text, graphics, images, sound, and dynamic features. Each web page is formatted using HyperText Markup Language (HTML), which is the standard page description language used with HTTP. HTML allows the web page to be displayed with the text and graphics, and allows for playing sound, animation, and video data. Once a user selects a particular hypertext link, the local system's web browser reads and interprets the Uniform Resource Locator (URL) address associated with such link. The browser then connects with the Web server at the selected URL, and requests the HTTP of the selected link. In return, the web server sends the requested link to the web browser running on the local system in HTML format for interpretation by the browser, and ultimately, viewing of the web page or site by the user.

In the process of retrieving the displayed hypertext links, a web server may be instructed to focus its search and display of results. This is accomplished by a user entering a search query into a search window of a search engine or searchable database (hereinafter collectively referred to as "search engines") running on the web server. The search query may include keywords and/or phrases. The search engine navigates the Internet or intranet to locate web pages containing the desired keywords and/or phrases. The search engine then returns a list of web pages containing such keywords and/or phrases for viewing by the user, whereby the web pages are ranked based on an algorithm used by the search engine.

However, a problem with conventional search engines is that the searches are limited to locating web page or web site files only on the Internet, or intranet, and displaying such web pages or sites to the user. To add to this problem, once the user is provided with these search results, if the user desires to search for the same topic or a similar topic at a later time, the search engine may display a new set of results that may, or may not, include those web pages or sites that were located in the previous search results. This is undesirable since the user may desire to access or re-access selected ones of the web pages or sites listed in the previous search results.

The above problems become even further complicated when the user searches for a previously searched for topic using different keywords or phrases than those used in the past. In such an event, the search engine typically returns search results that include numerous new web sites and pages, whereby the user must then perform the tedious and time-consuming task of browsing through the newly listed web sites and pages to locate a desired previously accessed web page or site of interest. Additionally, any saved navigation histories on how a user reached a particular web site or page are generally lost when the user is presented with a new list of search results.

Accordingly, it would be beneficial to provide methods, systems and apparatus for allowing a user to easily and quickly gain access to a detailed search result list that includes files (i.e., web pages and web sites) previously accessed by the user during a past session for enabling the user to locate a web site or web page of interest.

SUMMARY OF THE INVENTION

Bearing in mind the problems and deficiencies of the prior art, it is therefore an object of the present invention to provide methods, systems and apparatus for combining online and offline search results within one single overview in a search engine display.

Another object of the present invention is to provide methods, systems and apparatus that generate a combined online and offline search result list that allows a user to easily and quickly gain access to previously accessed files of interest.

It is another object of the present invention to provide methods, systems and apparatus for search engines and searchable content rich databases to incorporate within currently displayed search results, and bring to the users attention, previously accessed search results stored on a user's local system that are relevant to the current search request.

A further object of the invention is to provide methods, systems and apparatus for reconstructing a navigation path that allows a user to follow a browsing or search path previously followed by the user.

Still other objects and advantages of the invention will in part be obvious and will in part be apparent from the specification.

The above and other objects, which will be apparent to those skilled in art, are achieved in the present invention, which is directed to a method for generating search engine search results. The method includes providing a search engine and entering a search query into the search engine. Online files relating to the search query are then located using the search engine, in combination with locating offline files residing on a client computer that relate to the search query. These located online and offline files are then combined to generate a single search result overview that is displayed within the search engine display.

In this aspect of the invention, the offline files are previously ranked files from a past session that now reside on the client computer. This enables the invention to generate the single search result overview using the scoring algorithm of the search engine, whereby the offline files are ranked in combination with the online files within the present search results. The offline files of the single search result overview are preferably brought to the user's attention within the search engine display for indicating to the user that such offline files actually reside on the user's computer.

This method of generating search engine search results may further include identifying the user at the client computer with a unique identifier, and using this unique identifier, accessing the user's personal files stored on the client computer by the search engine. The online and offline files relevant to the entered search query are located for generating the present single search result overview. These search results are generated using the scoring algorithm of the search engine.

In the step of locating the offline files, it is first determined whether or not the search engine is willing to share the scoring algorithm with the client computer. If the search engine is willing to share the scoring algorithm, then it is determined whether or not the client computer is capable of executing the scoring algorithm. If the client computer is capable of executing the scoring algorithm, the scoring algorithm is downloaded to the client computer, the offline files ranked using such scoring algorithm, and then the ranked files are stored on the client computer for retrieval by the search engine. The component of the invention running on the search engine uses this information to generate the single search result overview.

In the event the client computer is not capable of executing the scoring algorithm, it must then be determined if the offline files were obtained from an online source. If the offline files are from an online source, the original online files for such offline files are located on the online source, and links to such original online files are stored in the client computer for retrieval by the search engine. However, if the offline files are not from an online source, then it is determined if the search engine will accept uploaded files from the client computer, and if so, files from the client computer are uploaded to the search engine, ranked using the scoring algorithm, and unique links to such ranked uploaded files are provided and stored on the client computer for retrieval by the search engine for use in accordance with the invention.

An alternative approach to locating the offline files is available when the search engine is not willing to share the scoring algorithm. In this aspect of the invention, it is determined if the offline files were obtained from an online source. In the event the offline files are from the online source, the original online files are located, a link to such original online files is generated by the search engine and stored on the client computer for providing the single search result overview of the invention.

If, however, the offline files are not from an online source, then it must be determined whether or not the search engine will accept uploaded files from the client computer. If uploaded files are accepted, selected files are uploaded from the client computer to the search engine and ranked using the search engine scoring algorithm. A unique link to these ranked uploaded files is generated on the search engine and stored in the client computer for later retrieval by the search engine for generating the single search result overview.

In generating search engine search results, the method may further include sending the single search result overview to the client computer, determining if a selected offline files within the search results are still available on the client computer, and if so, matching these stored offline files, which have been previously ranked during a past session, to the selected offline files within the search results. The search engine then retrieves past path information for the matching offline file for reconstructing a path previously followed. This information is incorporated into the search engine display along with the single search result overview of the invention.

The invention is also directed to systems and program storage devices for generate the single search result overview of the invention that includes both online files and offline files located in response to a search query and ranked using the scoring algorithm of the search engine.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiment of the present invention, reference will be made herein to FIGS. 1A-5 of the drawings in which like numerals refer to like features of the invention.

A problem with current search engines is that they do not combine online search results with offline (i.e., desktop) search results from a client computer. The present invention addresses this problem by providing methods, systems and program products for combining online and offline search results within a single search engine overview for display by a user. The combined single overview search results provide a user requesting a search query with ranked search results that include online files located on the Internet or intranet in combination with offline personal files stored on the user's computer. This advantageously enables the user to re-access files of interest, such as, web pages or web sites, that the user previously accessed during a past browsing or search session.

Figure 1A:
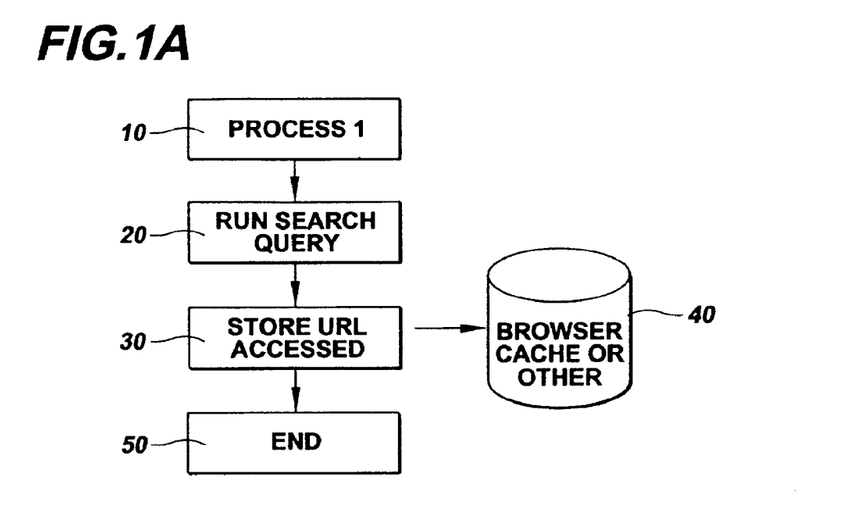
FIGS. 1A-B are schematics of the system of the present invention for providing combined online and offline search results.

Referring to FIG. 1A, the present invention includes a system running on a client computer for storing previously accessed files, in particular, previously accessed web pages and web sites, and for communicating with a system of the invention running on a search engine for generating the combined search results of the invention. In the first process 10, a user opens a search session on a search engine, requests a search query and the search engine locates files (i.e., web pages or sites) that match the search query (step 20). The scoring algorithm of the search engine is used to rank the files within the search results according to their relevancy to the requested search query. Once the user accesses a file within the search results, or browses from one file to the next, information identifying each accessed file, along with the order or path in which such files were accessed, is sent to the client computer (step 30) for storage into memory on the client computer (step 40), and for subsequent use in accordance with the invention as described below. The current search session is exited (step 50).

Figure 1B:
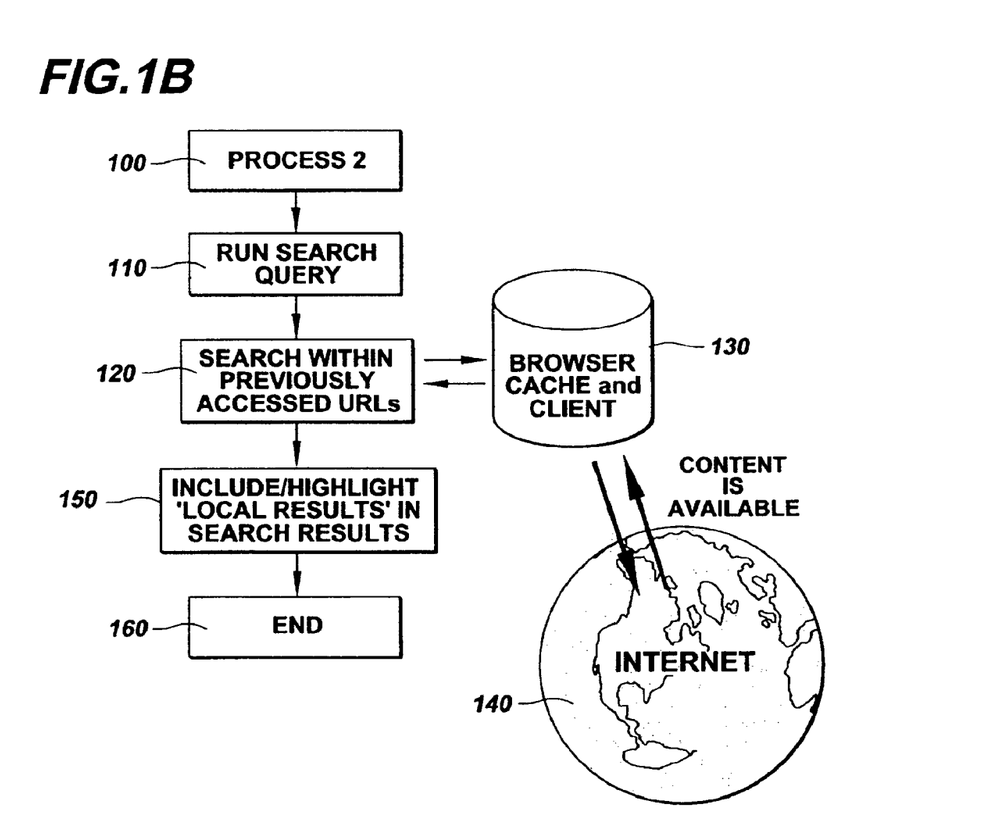

As shown in FIG. 1B, once the user decides to initiate a subsequent search session at a later time (step 100), the user enters another search query for running on the search engine (step 110). In accordance with the invention, the system running on the search engine then communicates with the system running on the client computer (steps 120, 130 and 140) for obtaining access to offline personal files stored on the client computer, and for including such offline files within the search results of the invention (step 150). These previously accessed offline files are ranked within the present combined search results using the scoring algorithm of the search engine, as discussed further below, and are preferably brought to the user's attention within the search results.

For instance, the present combined search results may include a list of 1000 ranked web pages and web sites, while highlighting to the user that 50 of such located relevant, ranked files reside on the user's client computer. Thus, the invention makes it possible for the combined search results of the invention to refer to offline personal files stored on a user's client computer. Another advantage of the invention is that since the personal files stored on the client computer include information identifying each previously accessed file (step 30), along with the order or path in which such files were accessed, the present combined search results include a feature that allows the user to reconstruct a path or navigation history previously followed during a past browsing or search session.

Another feature is that often when a user searches for a previously searched for topic using different keywords than those used in past searches, the previously accessed files from those past searches are stored in memory on the client computer as described above. Once stored therein, and the user searches for the same topic but using different keywords, the invention uses known data conversion technologies including, but not limited to, data mining, pattern recognition, analysis, trans-coding, and the like, to locate previously accessed files that relate to the current search query. As such, it should be appreciated that the invention is able to provide the combined online and offline search results across multiple browser sessions.

Figure 2:
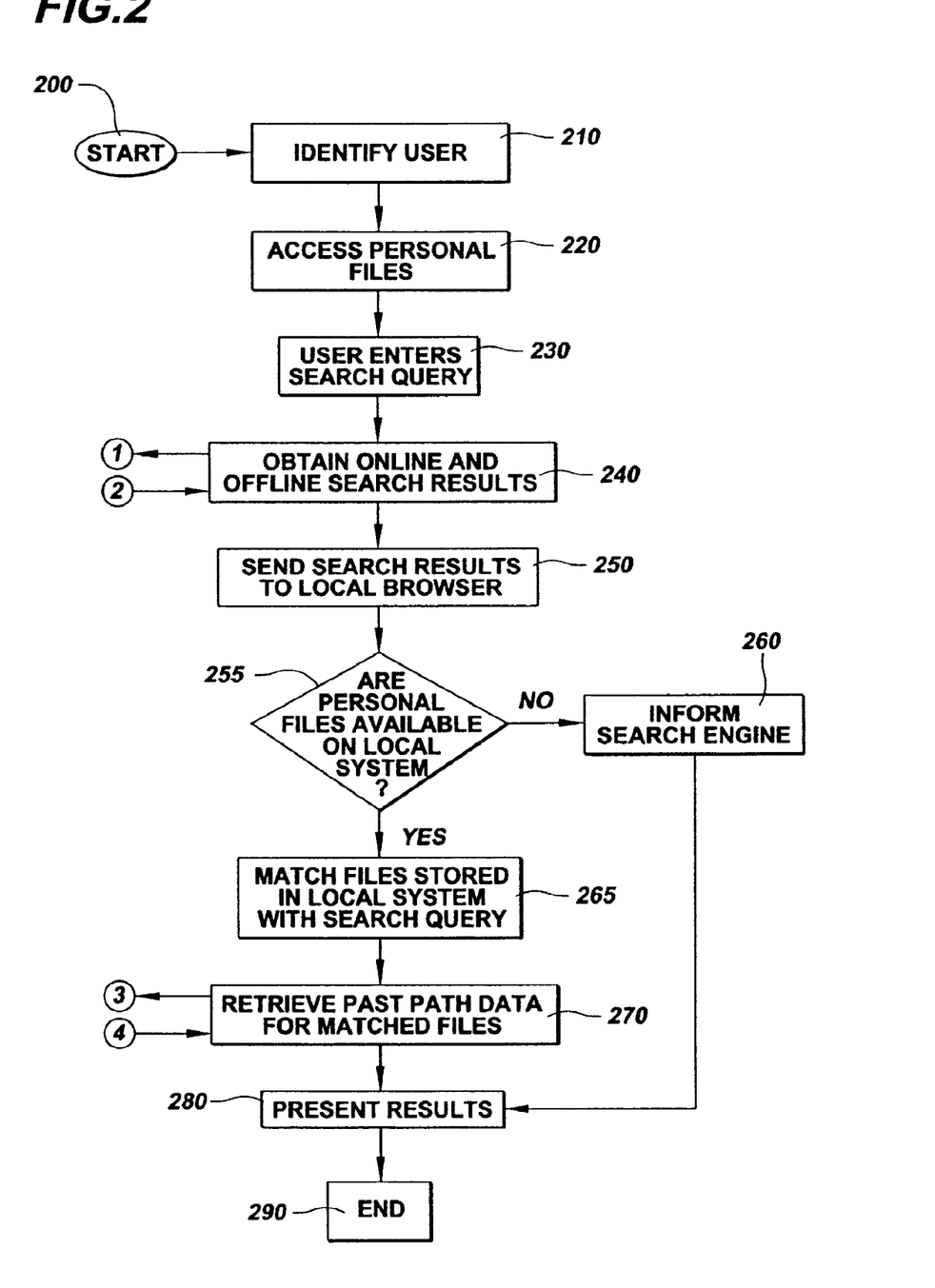
FIG. 2 illustrates a flow chart of the process flow of the invention for providing combined online and offline search results.
Figure 3:
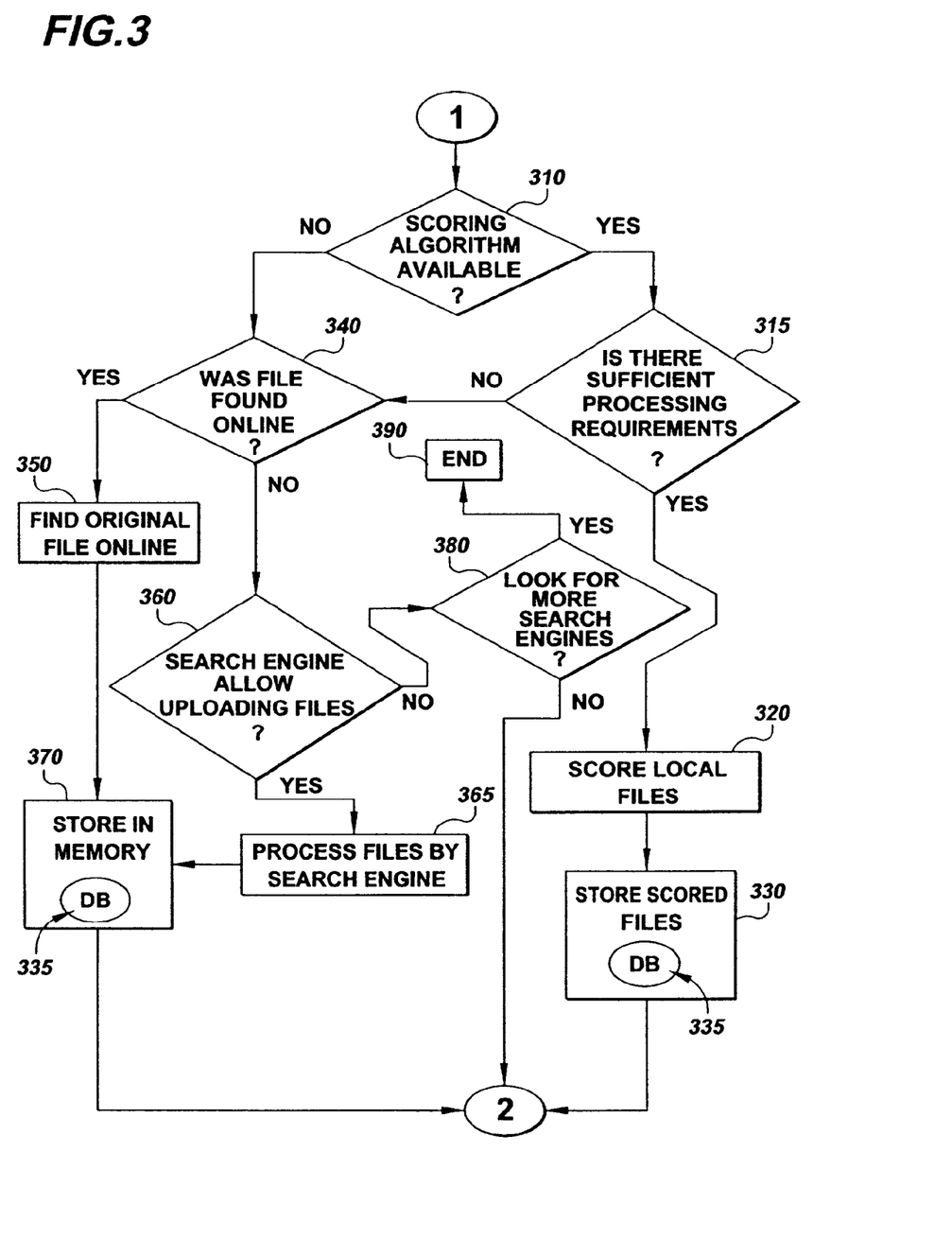
FIG. 3 illustrates a flow chart of the process flow for obtaining offline files from a client computer for inclusion in the combined online and offline search results of FIG. 2.
Figure 4:
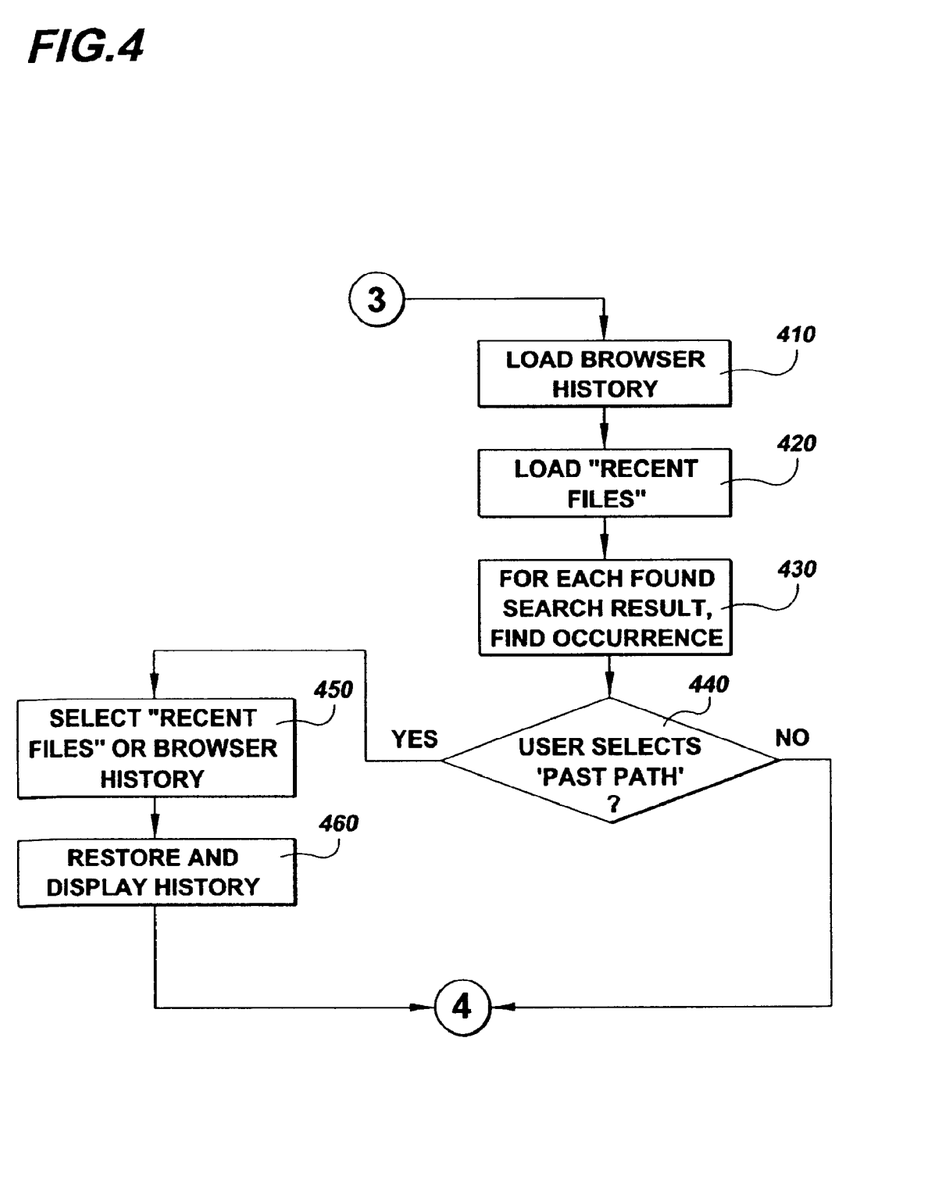
FIG. 4 illustrates a flow chart of the process flow for reconstructing a past path followed of a previously accessed file for inclusion in the combined online and offline search results of FIG. 2.

For ease of understanding the invention, reference is now made to the flow charts of FIGS. 2-4, which illustrate the method steps of the invention for enabling search engines, including searchable content rich databases, to incorporate relevant previously accessed references stored on a user's local system into a current online search result for providing the user with combined online and offline search results. Preferably, those files within the search results residing on the user's computer are brought to the user's attention. While the below description is of a preferred process flow of the invention, it should be appreciated and understood that several alternatives, modifications and variations may exist while not deviating from the present invention of providing combined online and offline search results.

In the flow charts of FIGS. 2-4, numerals in circles indicate connections to and from other parts of the flow chart. The flow chart descriptions of the process flow of the invention are as follows:

210 Identify User. A user on a client computer accesses a search engine running on the Internet or on an intranet, and is identified by a unique identifier to distinguish the user from other search engine users. The unique identifier may include, for instance, a username and password, the user's URL, a cookie on the user's computer, and the like. Once the user has been identified, the process flow continues to step 220.

220 Access Personal Files. Upon identifying the user, a link is provided between the search engine and the user's client computer. Since the user's personal files will not be directly contained within the search engine, Internet or intranet, this link will allow the search engine to access personal files residing on the user's computer. The user's personal files may include, but are not limited to, previously accessed and downloaded web pages, web sites, documents, and the like. The process flow goes to step 230.

230 User Enters Search Query. The user enters a search query in a window of the search engine, and the process flow continues to step 240.

240 Obtain Online and Offline Search Results. It is at this point that the search engine locates files both online (i.e., on the Internet or intranet) and offline files residing on the user's client computer that are relevant to the search query. The search engine ranks both relevant online and offline files using the search engine's scoring algorithm, and presents a combined list of search results to the user that include both online files from the Internet or intranet and offline files residing on the user's computer.

In accomplishing this task of providing combined online and offline search results, the search engine searches the Internet or intranet for online files (i.e., web pages or sites) that are relevant to the requested search query using the keywords or phrases of the search query. Simultaneously, using the same keywords or phrases of the search query, the invention searches and obtains relevant offline files from the user's computer for ranking and inclusion in the ranked search results in accordance with the invention. This process of obtaining offline search results is described in detail below, making reference to FIG. 3.

For a general understanding of the process of obtaining offline search results, the invention first determines whether or not the search engine is willing to share its scoring algorithm with the client computer (step 310). If the search engine is willing to share its scoring algorithm, and it has been determined that the user's client computer has sufficient processing power and capacity (step 315), the invention downloads the scoring algorithm to the client computer. The personal files residing on the client computer are then ranked for relevancy using the search engine scoring algorithm (step 320). These scored offline files are stored in memory on the client computer for uploading to the online search engine (step 330).

However, if the search engine is not willing to share its scoring algorithm (step 310), or there is not enough processing power on the client computer (step 315), then it is determined if the personal offline files were once online (step 340). If the offline files were obtained from the Internet or intranet, herein collectively referred to as an online source (i.e., WAN or LAN), then the invention matches the offline file to its original online file for using the scoring algorithm thereof to rank such file (step 350). A link to this matching online file is then stored in memory on the user's computer (step 370).

In the event the offline file was not originally online (step 340), the invention determines whether the search engine will accept uploaded personal files from the client computer (step 360). If uploaded files are accepted, personal files stored on the client computer are uploaded to the search engine. The search engine then ranks these uploaded personal files using its scoring algorithm, generates a link to the ranked personal files, and deletes the uploaded file itself (step 365). The link to the ranked personal files is stored with a unique identification in memory on the client computer (step 370). However, if the search engine does not accept uploaded files (step 360), then it is determined if more search engines are to be searched (step 380), and if so, the process ends (step 390). If no more search engines are to be searched (step 380), the process flow continues by locating and ranking online files and displaying such results to the user.

The ranked offline files stored in local memory on the client computer from step 330, and the link to the matching online file stored in the client computer from step 370, are both then uploaded to the online search engine for generating a combined list of online and offline search results. In so doing, the search engine locates online files on the Internet or intranet that are relevant to the search query, and simultaneously locates offline personal files from the user's client computer that are relevant to the search query in the manners as described herein. These online and offline files are scored using the search engine scoring algorithm to generate the combined list of online and offline search results ranked by relevancy according to the requested search query.

Once the combined list of online and offline search results are generated, the process flow goes to step 250.

Send Search Results to Local Browser. The combined list of online and offline search results are then sent to the user's computer. The process flow continues to step 255.

255 Are Personal Files Available on Local System? Using the combined list of search results, the invention then determines whether or not the offline files (i.e., those files residing on the client computer) within the combined list are still residing on the client computer. For each offline file within the combined list, the system of the invention running on the client computer then determines whether the matching file on the client computer is still available on the client computer. If the matching file is not available on the client computer, the process flow continues to step 260. However, if the matching file is available on the client computer, then the process flow goes to step 265.

260 Inform Search Engine. In the event files matching those offline files within the combined search result list are not available, or are no longer available, a notification of such unavailability is sent to the search engine. The search engine will then use this information when generating its final search results that are displayed to the user. The process flow goes to step 280.

265 Match Files Stored in Local System with Search Query. If matching files are available on the client computer, then the system matches those files stored on the client computer with the offline files from the combined list of search results. An essential feature is that these stored files from the client computer have been scored or ranked previously using the search engine scoring algorithm as discussed herein. Continue to step 270.

270 Retrieve Past Path data for Matched Files. Once the matching files are located on the client computer, the system then retrieves the past path information relating to such matching files stored on the client computer. This process of retrieving the past paths followed by the user is explained in more detail in relation to FIG. 5. The matching file and past path information is then sent to the search engine for further processing. The process flow continues to step 280.

280 Present Results. The search engine retrieves the non-available matching file information (from step 260), and the matching file and past path information (from steps 265-270), and uses this information to generate a combined search result report that includes both currently available offline files residing on the client computer and online files that are relevant to the search query. As discussed above, these combined online and offline search results are ranked according to their relevancy to the search query using the search engine scoring algorithm.

In so doing, relevant offline files residing on the user's client computer, and for use only by the user at the client computer, are preferably brought to the user's attention within the search results. This may be accomplished by highlighting or color-coding the offline files within the display of combined search results, displaying the relevant offline files in their own display window, in a pop-up window, or any other means of display that indicates to the user that selected files within the search results reside directly on the user's client computer. In presenting the combined offline and online search results of the invention to the user, the browser running on the client computer displays the search results of the invention through a Java enabler or even through HTML. The process continues to step 290.

290 End. The process flow ends once the combined search result report is displayed to the user. The user may then restart the process flow by entering in a new search query.

For a better understanding of how the offline search results are obtained in accordance with the invention, the detailed process flow of FIG. 3 is described below. Once it has been determined that the search engine must locate offline files residing on a client computer (step 240), the process flow is as follows:

310 Scoring algorithm available? The system of the invention running on the client computer determines whether the current search engine the user is logged onto is willing to share its scoring algorithm with the system for ranking offline files stored on the client computer. By using the search engine scoring algorithm, the offline files stored on the client computer are ranked or scored based on their relevancy to the requested search query. For example, located offline files may be ranked from highest to lowest based on the number of occurrences a searched keyword(s) of the query is located in the files.

If the search engine allows sharing of its scoring algorithm with the client computer, then this scoring algorithm is downloaded and stored on the client computer for ranking offline files located on the client computer. Once the scoring algorithm has been downloaded, the process flow continues to step 315. However, if the search engine does not allow sharing of its scoring algorithm, then the process flow continues to step 340.

315 Is there sufficient processing requirements? If the online search engine is willing to share its scoring algorithm with the client computer, the system of the invention then determines whether or not the client computer has sufficient processing power and resources to perform and execute the downloaded search engine scoring algorithm. For instance, it may be determined whether or not the client computer can execute the scoring algorithm using its current resources within any time constraints or within a reasonable amount of time.

If the client computer is capable of performing the downloaded scoring algorithm, the process flow continues to step 320. Alternatively, if the client computer does not have enough processing power and resources to perform such scoring algorithm, then the process flow continues to step 340.

320 Score local files. The system then searches the user's client computer for files stored on the client computer, which are relevant to the search query, and ranks these located offline files using the downloaded search engine scoring algorithm. Go to step 330.

330 Store scored files. The ranked offline files are then stored in a local database, e.g., DB1 335, residing on the user's client computer for including within the search results of step 240. Continue to step 240.

340 Was file found online? If it has been determined that the search engine does not allow sharing of its scoring algorithm (step 310), or that there is insufficient processing power and resources on the client computer to execute a search engine scoring algorithm (step 315), then the invention searches for an alternative approach for consuming less energy and/or resources on the user's client computer. In this approach, the invention uses similarities between online files and offline files to obtain relative scoring for the offline files stored on the client computer. In so doing, the invention first determines whether files stored on the client computer were ever on an online source (i.e., on the Internet or an intranet).

For instance, the invention may analyze the local files to determine if they are a web page or web site, or were downloaded onto the client computer from the Internet or an intranet or any other searchable database. This information may be obtained by the invention analyzing the client computer's local cache, or by analyzing the files themselves. If it is determined that the files were once online, the process flow continues to step 350. However, if the files were not online, then the process flow goes to step 360.

350 Find original file online. If the local offline file was once online, a search is conducted of the Internet or intranet using the search engine to locate the original of such file that is currently online. This enables the retrieval of the relevancy ranking of the current online file that matches the user's offline file using the search engine's scoring algorithm. Once located, a reference or link is generated to this online version of the file within the client computer. The process flow then goes to step 370.

360 Does the search engine allow uploading files? If, however, it is determined that the file stored on the local client computer was not previously online, the invention then determines whether or not the search engine will allow uploading of files from the user's local client computer. In so doing, a request is sent from the client computer to the online search engine asking the online search engine to accept uploaded files from the client computer for categorizing and ranking such files according to relevancy to the requested search query using the search engine's scoring algorithm. These categorized and ranked files are then made available only to the user as discussed below in relation to step 365. If the search engine accepts the uploading of files from the client computer, the process continues to step 365, and if not, the process goes to step 380.

365 Process files by search engine. In the event the search engine will accept and score uploaded offline files from the client computer (step 370), selected files from the user's client computer are uploaded to the online server. These files are selected based on location (locations such as "My Documents"), edit history (files that were not edited are likely not the user's own prepared documents) and optionally selection based on which files are selected for archiving on backup storage solutions. The search engine running on the server then categorizes the uploaded files from the client computer using the search engine's scoring algorithm to rank such files based on relevancy to the requested search query, preferably from highest to lowest.

In making the ranked personal file available only to the user, the search engine generates a link to the location of each ranked file on the user's computer, and deletes the uploaded file itself to save storage space on the search engine. The link uniquely identifies the location and ranking of each file on the user's computer, and is unique to the particular user computer for enabling the user to control access to his personal files located on the user's computer. In so doing, the user preferably controls access to his personal files through a password in combination with instructions on how the files are to be made available to the user by the search engine. It is these instructions that preferably include a command for identifying the user as the only person or entity having access to the unique link for accessing the files on the user's computer.

The process flow then continues to step 370.

370 Store in memory. The invention stores the reference or link to the ranked online matching file of the user's offline file from step 350, or alternatively, it stores the reference or link to the location of each ranked file on the user's computer from step 365 for enabling access to such file by only the user. In either approach, each reference or link is stored in the client computer's memory, such as in local database 335 or in a different database on the user computer. The process flow continues to step 240.

380 Look for more search engines. If the search engine does not allow uploading files from step 360, the process flow may continue by deciding whether or not the search query is to be entered into more search results. If the search query is to be searched for in other search engines, the process flow continues to step 390. However, if the search query is not to be searched in other search engines, the process goes to step 240.

390 End. At this point, it has been decided that other search engines are to be utilized for generating relevant search results for a requested search query. The process flow of the current session ends, and the user may then re-access the process flow of the invention by initiating a new search session on another search engine.

With respect to the step of retrieving the past path, this process allows the user to reconstruct a path previously followed during a past browsing or search session. An essential feature is that the files that the user previously accessed during such past session are now stored on the user's computer, along with the corresponding past path information (step 270). In so doing, the process advantageously enables a user to locate a desired web site that the user once located during a previous search session.

It should be understood that this step of retrieving the past path is optional, and may be selected by the user if the user desires such past path information. In the event the user would like to reconstruct a path previously followed, the user may select a past path option on the search engine window display. It should be appreciated that this past path option may be automatically running on the system of the invention such that when the search engine generates the combined offline and online search results, this past path information may be incorporated and embedded within these results. The user would then merely have to make the past path option selection.

Alternatively, the past path selection option may be selected by the user after the search engine generates the combined offline and online search results of the invention. In this aspect, once these combined search results are displayed to the user, the user may make a selection of the past path information for a particular file listed in the search results, and then the search engine would retrieve the past path information as described herein.

In retrieving the past path information, whether it is done before or after the combined search results of the invention are generated, once a file matching a search result offline file is located on the client computer (step 270), the path that the user took when he previously accessed this matching file is obtained by following the process flow as follows:

410 Load Browser History. Once a matching file is located on the client computer, the browser history associated with such file is loaded into the local memory stored on the client computer. The process continues to step 420.

420 Load "recent files". Recently accessed files from the client computer's operating system are also loaded into local memory stored on the client computer. The process goes to step 430.

430 For Each Found Search Result, Find Occurrence. The system of the invention running on the client computer then locates the occurrence of each located matching file within either the browser history stored into memory or the "recent files" stored in memory. Go to step 440.

440 Does User Want to Select "Past Path"? At this point, the user must determine whether or not to obtain information relating to the past path that the user took with respect to a particular file (i.e., web page or web site). This may be accomplished by the user selecting a "past path" selection on the user's display screen, which is discussed further below in relation to FIG. 5. In the event the user does not want "past path" information for any offline files within the combined search results, the process flow continues to step 280. If, however, the user wants to retrieve the past path for a particular offline file or files, then the user makes such a selection on the display screen, and the process flow continues to step 450.

450 Select "Recent Files" or Browser History. The invention then determines whether the selected "past path" resides within either the "recent files" or the browser history residing on the client computer. If the "past path" resides in either location, then for the selected file that the user desires past path information, the invention determines from the stored information on the client computer which files the user accessed immediately before and after the desired past path selection file. This process is repeated for all identified before and after accessed files, such that a path is generated that reconstructs the steps and files that the user previously accessed during a past session. The process flow continues to step 460.

460 Restore and Display History. The generated past path information from step 450 is sent to the search engine. The search engine uses this information when generating the combined online and offline search results (step 270) to display, along with the search results, the selected file for which past path information is desired, and displaying to the user the reconstructed path that the user followed when the selected file was previously accessed by the client computer. The selected file, for which, past path information is desired, is preferably brought to the user's attention, such as by highlighting the file. This reconstructed path may be displayed within the search result window, or within a separate window on the display screen. The process goes to step 270.

Figure 5:
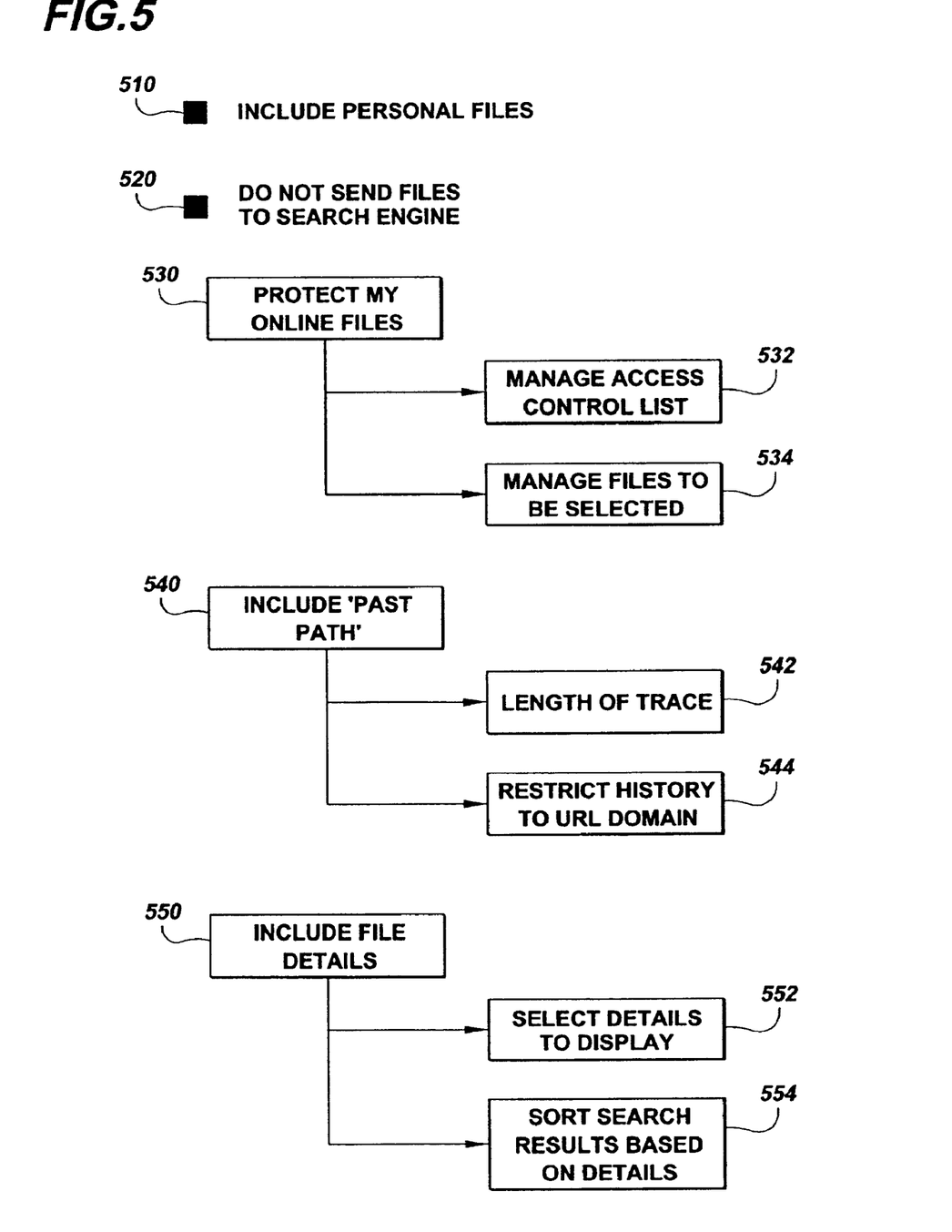
FIG. 5 illustrates selection options that may be displayed on a search engine window for employing the present invention of providing combined online and offline search results.

In initiating the present invention, the search engine display may be implemented with several new selection options, either as distinct windows within the display or as menu options, such as those shown in FIG. 5. These selection options may include options for a user to select whether or not he would like the personal files stored on the user's client computer to be accessed by the search engine and incorporated into the present combined online and offline search results of the invention. For instance, the search engine window may include an "Include Personal Files" option 510 for selection by the user for allowing the user's personal files to be incorporated, and optionally highlighted, within the combined online and offline search results. Alternatively, the user may select a "Do Not Send Files to Search Engine" option 520 that prevents the user's personal files from being accessed and incorporated into the present search results. This option may be desirable when confidential files reside on the client computer.

Other options include the "Protect My Online Files" 530, "Include Past Path" 540, and "Include File Details" 550 selections displayed on the search engine window. The "Protect My Online Files" 530 selection enables the user to control and manage which personal files the search engine has access to by managing an online access control file list 532, and differentiating the access control for online files by managing files to be selected 534.

When the user desires information relating to a past path followed during a previous session, the user may select the "Include Past Path" 540 option. As discussed above, this option enables the search engine to provide to the user with a history or path of previously accessed files (i.e., web sites or web pages) so that the user can re-access a desired file. In so doing, preferences may be set to limit the generated past path history. For instance, the search engine display may be implemented with further options that the user may select from, such as, providing the length of the trace 542, restricting the history to URL domains 544 to which the file in the search result belongs, and the like.

The user may also choose to select an "Include File Details" 550 option. This option indicates to the search engine that file details must be included within the combined search results of the invention. This "Include File Details" option enables the user to select which file details (e.g., file name, created date, file size, date last modified, date last accessed, etc.) the user would like to view within the combined search results, thereby enabling the search engine to provide search results in accordance with the user's preferences.

The present invention is suitable for use with online and local search systems, as well as within browser technologies. It should be appreciated that components of the invention may be embodied as a computer program product stored on a program storage device. These program storage devices may be devised, made and used as a component of a machine that utilizes optics, magnetic properties and/or electronics to perform certain of the method steps of the present invention. Such program storage devices may include, but are not limited to, magnetic media such as diskettes or computer hard drives, magnetic tapes, optical disks, Read Only Memory (ROM), floppy disks, semiconductor chips and the like. A computer readable program code means in known source code may be employed to convert certain of the method steps described herein.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for generating search engine search results comprising:
   providing a search engine having a scoring algorithm;
   entering a search query into said search engine;
   locating online files relating to said search query using said search engine;
   locating offline files residing on a client computer relating to said search query, said offline files consisting of previously accessed online files stored on said client computer from a previous online session;
   determining if said search engine is willing to share said scoring algorithm with said client computer and if said client computer is capable of executing said scoring algorithm, wherein
      if said client computer is capable of executing said scoring algorithm, then downloading said scoring algorithm to said client computer, ranking said offline files on said client computer according to relevancy to said search query using said downloaded scoring algorithm and storing said ranked offline files on said client computer, and if said client computer is not capable of executing said scoring algorithm, then determining if said offline files were obtained from an online source by locating original online files of said offline files on said online source and storing links to said original online files in said client computer;

retrieving said online files, said ranked offline files and said original online files by said search engine;

generating a single, ranked search result list by combining said online files with said ranked offline files and said original online files; and displaying said single, ranked search result list to a user on a display screen of said client computer.

2. The method of claim 1 wherein said offline files comprise previously ranked offline files residing on said client computer, whereby said single, ranked search result list is generated using said scoring algorithm of said search engine to rank said online files in conjunction with said previously ranked offline files and said original online files.

3. The method of claim 1 wherein said offline files within said Single, ranked search result list are brought to said user's attention for indicating to said user that said offline files reside on said client computer.

4. The method of claim 1 further including the steps of:
identifying a user at said client computer using a unique identifier;
accessing said offline files stored on said client computer by said search engine utilizing said unique identifier;
locating said online and offline files relevant to said entered search query; and
generating said single, ranked search result list having said online files in combination with said offline files using said scoring algorithm of said search engine.

5. The method of claim 1 wherein if said offline files were not obtained from said online source, then determining if said search engine will accept uploaded files from said client computer.

6. The method of claim 5 wherein if said search engine accepts said uploaded files, said method further including the steps of:
uploading selected files from said client computer to said search engine;
ranking said selected files according to relevancy to said search query using said scoring algorithm of said search engine;
generating a unique link to said ranked selected files on said search engine;
storing said unique link in said client computer; and
retrieving said unique link by said search engine for generating said single, ranked search result list.

7. The method of claim 1 wherein if said search engine is not willing to share said scoring algorithm, then determining if said offline files were obtained from an online source.

8. The method of claim 7 wherein if said offline files were obtained from said online source, said method further including the steps of:
locating original online files of said offline files on said online source;
storing a link to said original online files in said client computer;
retrieving said original online files by said search engine for generating said singlet, ranked search result list.

9. The method of claim 7 wherein if said offline files were not obtained from said online source, then determining if said search engine will accept uploaded files from said client computer.

10. The method of claim 9 wherein if said search engine accepts said uploaded files, said method further including the steps of:
uploading selected files from said client computer to said search engine;
ranking said selected files according to relevancy to said search query using said scoring algorithm of said search engine;
generating a unique link to said ranked selected files on said search engine;
storing said unique link in said client computer; and
retrieving said unique link by said search engine for generating said single, ranked search result list.

11. The method of claim 1 further including the steps of:
sending said single, ranked search result list to said client computer; determining if a selected offline file within said single, ranked search result list is currently available on said client computer;
and if said offline file is available, matching a previously ranked offline file stored on said client computer with said selected offline file from said single, ranked search result list.

12. The method of claim 11 further including the steps of:
retrieving past path information of said matching offline file for reconstructing a path previously followed;
sending said past path information to said search engine; and
generating said single, ranked search result list along with a display of said past path information for said matching offline file.

13. A program storage device readable by a machine, tangibly embodying a program of instructions executable by the machine to perform method steps for generating search engine search results comprising:
providing a search engine having a scoring algorithm;
entering a search query into said search engine;
locating online files relating to said search query using said search engine;
locating offline files residing on a client computer relating to said search query, said offline files consisting of previously accessed online files stored on said client computer from a previous online session;
determining if said search engine is willing to share said scoring algorithm with said client computer and if said client computer is capable of executing said scoring algorithm, wherein
if said client computer is capable of executing said scoring algorithm, then downloading said scoring algorithm to said client computer, ranking said offline files on said client computer according to relevancy to said search query using said downloaded scoring algorithm and storing said ranked offline files on said client computer, and
if said client computer is not capable of executing said scoring algorithm, then determining if said offline files were obtained from an online source by locating original online files of said offline files on said online source and storing links to said original online files in said client computer;
retrieving said online files, said ranked offline files and said original online files by said search engine;

generating a single, ranked search result list by said search engine combining said online files with said ranked offline files and said original online file; and displaying said single, ranked search result list to a user on a display screen of said client computer.

14. A system for generating search engine search results comprising:

a search engine having a scoring algorithm, said search engine adapted to receive a search query;

a client computer in communication with said search engine;

a first component that locates online files relating to said search query using said search engine;

a second component that locates offline files residing on said client computer relating to said search query;

a set of instructions that determines if said search engine is willing to share said scoring algorithm with said client computer and if said client computer is capable of executing said scoring algorithm, wherein if said client computer is capable of executing said scoring algorithm, then downloading said scoring algorithm to said client computer, ranking said located offline files on said client computer according to relevancy to said search query using said downloaded scoring algorithm and storing said ranked offline files on said client computer, and if said client computer is not capable of executing said scoring algorithm, then determining if said located offline files were obtained from an online source by locating original online files of said offline files on said online source and storing links to said original online files in said client computer;

a third component that retrieves said online files, said ranked offline files and said original online files by said search engine;

a single, ranked search result list generated by said scoring algorithm by combining said online files with said ranked offline files and said original online files; and a display screen of said client computer displaying said single, ranked search result list to a user.

* * * * *